Patented Feb. 21, 1950

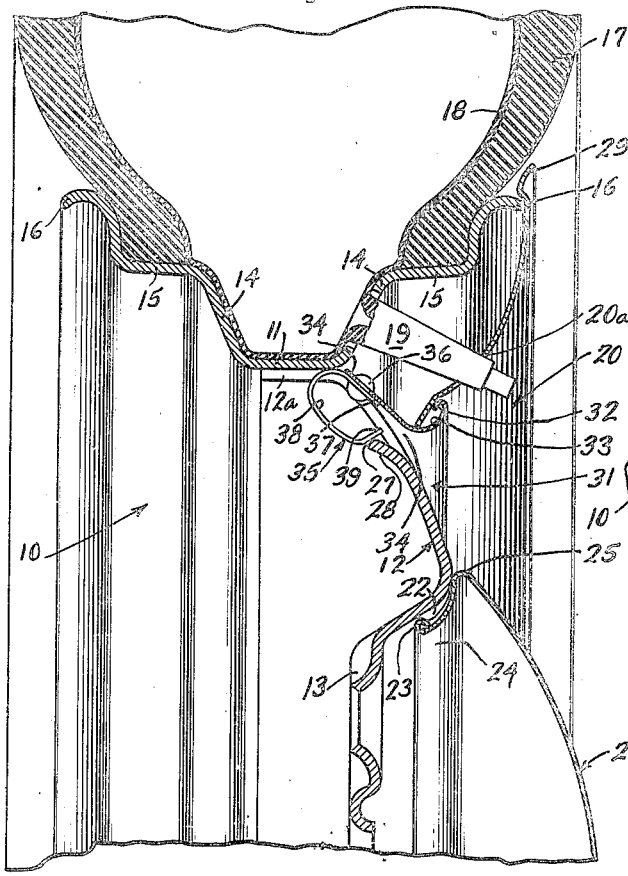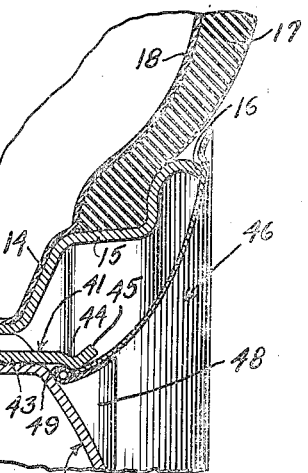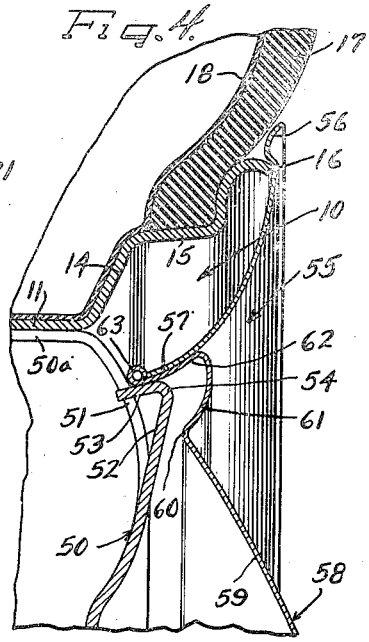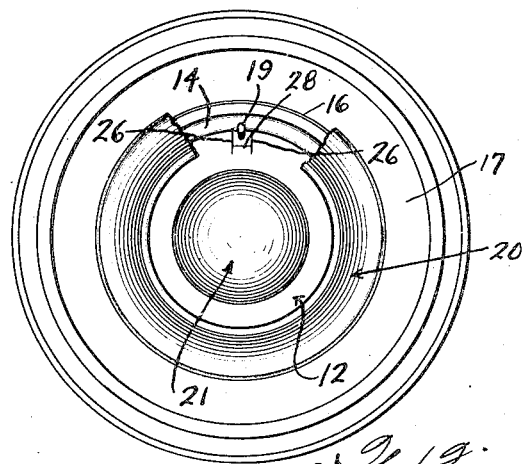
Inventor
GEORGE ALBERT LYON

2,497,895

UNITED STATES PATENT OFFICE 2,497,895

WHEEL COVER

George Albert Lyon, Allenhurst, N. J.

Original application January 7, 1944, Serial No. 517,322. Divided and this application October 30, 1944, Serial No. 560,955

4 Claims. (Cl. 301—37)

This invention relates to an improved wheel structure and more particularly to a novel combination of a cover or trim on a wheel together with interposed retaining means.

An object of this invention is to provide an improved cover and retaining means for holding the same on the body part of a wheel.

It is another object of the invention to provide an improved wheel cover structure which is so arranged that the cover may be detachably retained in place without necessitating auxiliary attachment members.

It should be noted that the subject-matter of this application has been divided from my copending application, Serial No. 517,322, filed January 7, 1944, now abandoned.

Still another object of the present invention is to provide an improved arrangement for detachably retaining over the outer side of a wheel structure a cover assembly including a radially outer annular part formed from sheet synthetic plastic material or the like whereby it is locally, temporarily, resilient and yet self-sustaining as to form so that it will immediately snap back to initial configuration when distorting pressures are relieved therefrom, this cover being provided with a radial cross-sectional expanse whereby it entirely covers the outer side of a tire rim of a wheel over which it is secured and whereby it substantially conforms to the configuration of the adjacent side wall of a tire in a wheel over which it is disposed, thereby to give the appearance of being a continuation of the tire and to appear as a part thereof and furthermore to appear as a white side wall of a massive tire mounted upon a wheel of minimum dimensions.

In accordance with the general features of the invention as shown in certain forms shown herein, there is provided an improved wheel including a flanged tire rim of the drop center type and a central load bearing portion secured thereto, the load bearing portion being slit from the radially outer periphery thereof inwardly to provide a lip between paired slits, said lip being constructed from a material of the central load bearing portion and being deformed to receive the attachment portion of a circular cover assembly disposed on the wheel, the cover assembly including a radially outer annular part formed from plastic material and a relatively rigid annular retaining member having a part thereof arranged to engage the deformed lip and also having a part arranged to retainingly engage a radially inner part of the cover and extending over the axially outer side of a portion of the cover to provide an ornamental border therefor.

In accordance with still another form of the invention shown herein, there is provided a wheel structure having a tire rim of the drop center flanged type and a central load bearing portion, there being spaced apertures along the junction of the rim and the load bearing portion, retaining elements each having a shank welded to an axially inwardly extending flange at the said wheel openings and having an axially outwardly extending, radially inwardly humped portion for receiving the snap-on portion of a cover associated with the wheel.

Many other objects and advantages of the invention will become apparent from the following description and accompanying drawings, in which:

Figure 1 is a side elevational view of a wheel embodying one form of my invention, parts being broken away for illustrative purposes;

Figure 2 is a fragmentary, enlarged radial cross sectional view of the construction shown in Figure 1;

Figure 3 is a fragmentary, enlarged radial cross sectional view of a modified form of my invention; and Figure 4 is a fragmentary, enlarged radial cross-sectional view of a still further modified form of my invention.

In the wheel construction shown herein, the tire rims of the various embodiments are of identical construction and thus the parts thereof are indicated by similar numerals.

In the form of the invention shown in Figures 1 and 2 the wheel construction includes a tire rim 10 having a base flange 11 and a central load bearing portion 12 provided with an axially inwardly extending flange 12a which is secured to the base flange 11 of the rim 10 by means of welding or riveting or the like.

The central load bearing portion 12 is further provided at the radially inner part thereof with a bolt-on flange 13 which is arranged to receive wheel bolts, whereby the wheel may be secured to an appropriate part of a vehicle such as the brake drum or the like. The tire rim 10 is further provided with opposite side wall flanges 14, opposite intermediate flanges 15 opposite edge portions 16 between which may be disposed a tire 17 having an inner tube 18 provided with a valve stem 19. The valve stem 19, as will be seen from Figure 2, is aligned with and extends through a suitable aperture in the respective side walls 14 whereby it protrudes outwardly from the wheel to be available for application of the nozzle of an air hose thereto for inflation of the inner tube 18.

To the end that a multi-part cover assembly having a separate radially outer annular part 20 and a central circular hub cap simulating part 21 may be secured to the wheel in detachable relationship thereto, the central load bearing portion 12 is provided with a plurality of circularly aligned, circumferentially spaced protuberances 22 at a radially inner part thereof for receiving a snap-on bead 23 on a resilient snap-on flange 24 of the cover member 21. It will be seen that the operator need merely align the cover 21 concentrically with the center of the wheel and urge the same axially inwardly whereupon the bead 23 is forced out of round temporarily until it passes the peaks of protuberances 22 whereupon it will immediately snap into its round configuration to assume tightly the position shown in Figure 2. If the operator desires to remove the hub cap simulating cover portion 21 it will be seen that it is merely necessary to insert the point of a pry-off tool behind the radially outer extremity thereof, whereupon the bead 23 at that point will be drawn axially outwardly from the wheel over the respective humps. Thereafter the entire cover may be easily removed from the wheel.

To the end that the radially outer annular cover part 20 may be detachably secured to the wheel, the radially outer part of the load bearing portion is first slit as shown at 26 in Figure 1, thereby leaving a lip or tongue portion therebetween. As best shown in Figure 2, this lip or tongue portion is preferably cut short to provide an edge 27 and is then bent axially inwardly, radially inwardly as shown at 28.

The radially outer annular cover portion 20, which, as explained previously, is preferably formed from synthetic plastic sheet material, is provided at the radially outer edge thereof with a flange 29 which preferably extends radially outwardly beyond the edge portion 16 of the tire rim to conceal the junction between the rim 10 and the tire therein. The cover 20 then extends radially inwardly over the outer side of the tire rim to conceal the flanges 14 and 15 thereof and, as shown in Figure 2, terminates in a radially inner margin 30 which is disposed radially inwardly of the junction between the tire rim 10 and the central load bearing portion 12.

To the end that the cover member 20 may be securely maintained upon the wheel structure and in easy-on, hard-off relationship thereto, there is provided an annular retaining member 31 having an axially outer terminal edge bent back upon the body thereof as at 32 to present a smooth surface to the adjacent portion of the cover 20. The intermediate part of the annular retaining member 31 is preferably beaded as shown at 33, this beaded portion 33 overlying the margin 30 of the cover 20. The retaining member then extends radially outwardly, axially inwardly and obliquely to form an annular flange 34 which preferably terminates in an edge portion which abuts the adjacent portion of the radially inner surface of the tire rim 10 with a line contact for supporting the cover assembly.

As will be seen from Figure 2, the cover member 20 is associated with the annular retaining member 31 in such a manner that an intermediate part thereof abuttingly engages the turned back flange 32 of the retaining member while the radially inner edge thereof abuts the radially outer surface of the flange portion 34. In assembling the unit as described above, it will be seen that the parts may be put together before the curvate portion 33 is formed, whereupon this curvate portion may be rolled to lock the cover in the position shown.

To the end that the unit including the cover member 20 and the retaining member 31 may be secured to the wheel structure in hard-off, easy-on relationship a plurality of spring clip members 35 are secured to the axially inner face of the flange 34 by means of rivets or the like, as shown at 36. The spring clips are, of course, aligned on the annulus 31 to coincide with the spacing of the lips 28 on the central load bearing portion 12 and each includes a portion 37 which is secured to the retaining annulus by the rivet 36 and a bent back resilient portion 38 terminating in a tip 39 which is bent to extend axially outwardly, radially outwardly, and obliquely for engagement with the radially outer corner of the edge 27 on the lip 28.

From Figure 2, it will be seen that the radial dimension of the clips is such that the radially outer extremity thereof abuts the adjacent portion of the radially inner surface of the base flange 11 on the tire rim 10, while the tips 39 are bitingly engaged by the corner of the edge 27 of the tips 28. It will be seen that when in this position the clip members 35 are compressed between the lips 28 and the tire rim to provide an extremely secure relationship.

In applying the radially outer cover assembly to the wheel structure, it will be seen that the operator need merely align the same concentrically with the wheel structure and then urge the assembly axially inwardly, whereupon the bent back portion 38 of the clips will flex radially outwardly under the influence of engagement against the lip 28 until the outer cam faces of the tips 39 are aligned with the edge of the respective lips 28, whereupon the bent back portions 38 spring resiliently outwardly to provide an attachment which is such that the cover may be removed only by the application of considerable force. On the other hand, it will be seen that the application of the cover 20 and its appurtenant parts to the wheel requires a minimum of axial inward pressure.

In the construction of Figure 3 the central load bearing portion 40 of the wheel is provided with an axially inwardly extending peripheral skirt 40a which is depressed radially inwardly at spaced portions to provide wheel openings. In this construction the retaining means on the wheel comprises individual members 41 which include axially inwardly extending portions 42 which are secured to the adjacent portion of the radially outer surface of the flange 40a as by means of welding as shown at 43. The outer ends of the respective members 41 are provided with radially inwardly extending humps 44, these humps each terminating in an axially outwardly, radially outwardly, obliquely disposed tip or end portion 45 having a cam surface on the radially inner side thereof.

In the construction of Figure 3, the cover assembly includes a radially outer annular plastic portion 46 having a radially outer marginal flange 47 which preferably extends beyond the edge portion 16 of the tire rim. The cover member 46 is of such cross-sectional expanse that it extends radially inwardly to a point adjacent the ends of the respective retaining members 41. To the end that a snap-on engagement may be obtained between the cover 46 and the respective retaining members 41, the cover is provided at the radially inner margin thereof with a rigidifying, retaining member 48 which, like the retaining annulus 31 of Figure 2, is formed from relatively rigid material such as sheet steel or the like, and preferably stainless steel, whereby a high luster may be imparted thereto so that the axially outwardly exposed portion may serve as a bright, rigidifying, ornamental border for the cover. In the construction of Figure 3, the retaining annulus 48 is rolled at the axially inner peripheral edge thereof as shown at 49, the bead formation 49, which results from the rolling, serving to abut the radially inner edge of the cover to maintain the same in permanent surface engagement with the axially outer part of the retaining member. It will be understood that prior to the application of the cover to the wheel structure, the cover 46 and the part 48, still in unrolled condition, are disposed against one another in surface abutment whereupon the axially inner margin of the retaining member 48 is subjected to a rolling operation to secure the parts together as shown.

In constructing the annulus 48, the bead 49 thereof is arranged to prescribe a circle having a larger diameter than that prescribed by the radially inner extremity of the humps 44 on the respective retaining members 41 on the wheel. Thus, when the cover, constructed as shown in Figure 3, is concentrically aligned with the wheel, and urged axially inwardly thereof, it will be seen that as the bead 49 passes the humps 44 it will be slightly out of round until it has obtained the position shown in Figure 3, whereupon it will again assume its circular configuration to provide the desired retained engagement. Thus with this construction it will be seen that the radially inner part of the cover 46, as is the case with the cover 20 of Figure 2, is rigidified and protected against breakage by the relatively rigid retaining annulus.

While in the construction of Figure 2 the cover may be removed from the wheel structure by insertion of the point of a pry-off tool under the portion 33 of the retaining member and then under the tips 39 to urge the same springingly outwardly, the operator in the construction of Figure 3 merely flexes the radially outer part of the cover 46 outwardly and downwardly and inserts the point of a pry-off tool between the tips 45 of one of the retaining members 41 and the adjacent portion of the marginal part of the cover whereupon axial outward movement of the point of the tool will draw that portion of the bead 49 axially outwardly to initiate the removal operation. During this operation it will be seen that the axially exposed, rigidifying ornamental part of the annulus 48 serves to protect the inner margin of the cover 46 and back up the same against breakage as a result of engagement of the pry-off tool.

In the construction of Figure 4 the wheel is provided with a central load bearing portion 50 provided with an axially inwardly extending peripheral flange 50a which is secured to the tire rim and particularly the base flange 11 thereof as previously described. The central load bearing portion 50 is preferably provided with an axially outwardly bulging annular portion 51 which is slotted at spaced points, the slots being formed in pairs to again provide a lip structure. In the present instance the lip structure is in a form varying from that shown at 28 in Figure 2. In this construction the lip extends substantially radially outwardly as at 52 and is then bent abruptly axially inwardly as at 53 to provide a seat for the attachment portion of the associated cover assembly. Preferably the portion 53 of the lip is bent radially inwardly sufficiently so that the radially outer curved portion 54 serves as a radially outwardly extending hump.

In the construction of Figure 4 the cover assembly includes a radially outer annular cover part 55 which is likewise formed from a suitably flexible material such as plastic or the like. This cover member 55 is provided at the radially outer margin thereof with a flange 56 which again extends over the edge portion 16 of the tire rim to conceal the junction between the tire and the rim.

The cover member 55 extends radially inwardly to a point beyond the junction of the tire rim 10 and the central load bearing portion 50 and into the vicinity of the radially outer extremity of the lips 52. The radially inner margin of the plastic cover 55 is curved axially inwardly as shown at 57, this portion being associated retainingly with the radially outer part of the central circular hub cap simulating member 58 preferably formed from more rigid material such as sheet stainless steel or the like, whereby it may be polished and thus provided with a high luster to augment the ornamental appearance of the entire cover assembly.

The central hub cap simulating cover member 58 is provided with a central crowned portion 59 terminating in an axially inwardly extending annular grooved part 60 which in turn merges with an axially outwardly convex annular border portion 61. The border portion 61 terminates in a generally axially inwardly extending flange 62 which receives the portion 57 of the cover member 55 in supporting, surface engagement. In this construction again the parts may be placed together with a portion of the flange 62 overextending the flange 57 whereupon the cover member 58 may be subjected to a suitable rolling operation to provide a radially outwardly rolled bead 63 which serves as an abutment for the radially inner edge of the cover member 55. It will be seen that since the flanges 57 and 62 extend generally radially outwardly, axially outwardly and thus obliquely, the parts are retained in permanent engagement with one another due to the fact that the cover 55 may not slip axially inwardly on the cover 58 due to the presence of the snap-on bead 63. It will therefore be seen that in the construction of Figure 4, the axially inwardly extending flanges 57 and 62, together with the bead 63 of the cover member 58 serve as an inwardly extending snap-on flange for engagement over the deformed lips 52.

In applying the construction of Figure 4 to the wheel structure the operator merely aligns the assembled covers concentrically with the wheel structure and forces the same axially inwardly whereupon the inwardly extending multiple flange and the bead 63 are momentarily forced out of their circular configuration to permit passage over the radially outer extremities of the lips 52. Thereafter the bead 63 rides down the cam surfaces of the portions 53 of the lips until the undeformed sections of the wheel are engaged by the bead 63. Thus it will be seen that a secure retained engagement between the cover and the wheel is obtained.

From the foregoing it will be seen that there is provided herein a multi-part cover assembly in which the radially outer part is formed from plastic material and is configurated to conceal the tire rim and to simulate the side wall of the tire to give the appearance of being a continuation thereof, the cover assembly also including a relatively rigid means arranged to protect the radially inner border of the plastic cover member and to aid in the attachment thereof to the wheel structure. Furthermore there is provided herein, in the various embodiments shown, an improved wheel structure in which a non-yielding lip is provided for securely maintaining the cover on the wheel.

As will be seen from Figure 2 the tire valve stem 19 preferably is of such a length that it extends outwardly sufficiently far to protrude through an aperture 20a in the annulus 20, thereby to be available for application of the nozzle of an air hose thereto. If desired the annulus 20 may be made without the aperture 20a and the valve stem may be constructed of lesser length, whereby it will be entirely concealed by the annulus and will be available for application of the nozzle of an air hose merely by flexing the adjacent portion of the annulus outwardly. Likewise it will be seen that wheel balancing weights may be secured to the edge portion 16 of the tire rim so that they nest therein, these weights being entirely concealed by the cover construction shown.

What I claim is:

1. In combination in a wheel structure, a flanged tire rim, a stamped metallic load bearing body portion concentrically secured within said rim, said body having annularly spaced openings and rigid cover retaining lips thereon projecting from said openings and spaced radially inwardly from said tire rim, and a cover comprising an annular resiliently flexible plastic member and a circular metallic member for engagement with said retaining lips and securing said plastic member on the wheel, said plastic member being dimensioned to lie in concealing relation to the tire rim and having a concave convex cross-sectional shape extending radially and axially inwardly over the tire rim in general simulation of an inward continuation of the side wall of a tire supported in said rim, said metallic member having a portion thereof in engagement with a substantial width of the axially outer side of the inner margin of the plastic member and extending axially inwardly and radially outwardly in retaining abutment with the inner edge of said plastic member for maintaining assembly therewith, said axially inwardly and radially outwardly turned portion of the metal member having a radially resilient structure yieldably engageable with said rigid retaining lips in snap-on, pry-off relationship, said axially inwardly and radially outwardly turned portion being readily accessible for engagement by a pry-off tool for releasing the cover assembly from said lips.

2. In combination in a wheel structure, a flanged tire rim, a stamped metallic load bearing body portion concentrically secured within said rim, said body having annularly spaced openings and rigid cover retaining lips thereon projecting from said openings and spaced radially inwardly from said tire rim, and a cover comprising an annular resiliently flexible plastic member and a circular metallic member for engagement with said retaining lips and securing said plastic member on the wheel, said plastic member being dimensioned to lie in concealing relation to the tire rim and having a concave convex cross-sectional shape extending radially and axially inwardly over the tire rim in general simulation of an inward continuation of the side wall of a tire supported in said rim, said metallic member having a portion thereof in engagement with a substantial width of the axially outer side of the inner margin of the plastic member and extending axially inwardly and radially outwardly in retaining abutment with the inner edge of said plastic member for maintaining assembly therewith, said axially inwardly and radially outwardly turned portion of the metal member having a radially resilient structure yieldably engageable with said rigid retaining lips in snap-on, pry-off relationship, said axially inwardly and radially outwardly turned portion being readily accessible for engagement by a pry-off tool for releasing the cover assembly from said lips, said axially inwardly and radially outwardly turned portion of the metallic member comprising an annular flange and spring clips carried thereby engaging said rigid cover-retaining lips.

3. In combination in a wheel structure, a flanged tire rim, a stamped metallic load bearing body portion concentrically secured within said rim, said body having annularly spaced openings and rigid cover retaining lips thereon projecting from said openings and spaced radially inwardly from said tire rim, and a cover comprising an annular resiliently flexible plastic member and a circular metallic member for engagement with said retaining lips and securing said plastic member on the wheel, said plastic member being dimensioned to lie in concealing relation to the tire rim and having a concave convex cross-sectional shape extending radially and axially inwardly over the tire rim in general simulation of an inward continuation of the side wall of a tire supported in said rim, said metallic member having a portion thereof in engagement with a substantial width of the axially outer side of the inner margin of the plastic member and extending axially inwardly and radially outwardly in retaining abutment with the inner edge of said plastic member for maintaining assembly therewith, said axially inwardly and radially outwardly turned portion of the metal member having a radially resilient structure yieldably engageable with said rigid retaining lips in snap-on, pry-off relationship, said axially inwardly and radially outwardly turned portion being readily accessible for engagement by a pry-off tool for releasing the cover assembly from said lips, said metallic member being in the form of an annulus with the axially inwardly and radially outwardly turned portion comprising a turned bead abutted edgewise by the plastic member and directly engaging the rigid cover-retaining lips.

4. In combination in a wheel structure, a flanged tire rim, a stamped metallic load bearing body portion concentrically secured within said rim, said body having annularly spaced rigid cover retaining lips thereon spaced radially inwardly from said tire rim, and a cover comprising an annular resiliently flexible plastic member and a circular metallic member for engagement with said retaining lips and securing said plastic member on the wheel, said plastic member being dimensioned to lie in concealing relation to the tire rim and having a concave convex cross-sectional shape extending radially and axially inwardly over the tire rim in general simulation of an inward continuation of the side wall of a tire supported in said rim, said metallic member having a portion thereof in engagement with a substantial width of the axially outer side of the inner margin of the plastic member and extending axially inwardly and radially outwardly in retaining abutment with the inner edge of said plastic member for maintaining assembly therewith, said axially inwardly and radially outwardly turned portion of the metal member having a radially resilient structure yieldably engageable with said rigid retaining lips in snap-on, pry-off relationship, said axially inwardly and radially outwardly turned portion being readily accessible for engagement by a pry-off tool for releasing the cover assembly from said lips, said metallic member being in the form of a hub cap with the portion thereof engaging the plastic member comprising an integral flange of complementary curvature to make full face-to-face engagement with the inner margin of the plastic member and with the axially inwardly and radially outwardly turned portion comprising a resilient bead which is engaged in edgewise retaining abutment by the plastic member.

GEORGE ALBERT LYON.

REFERENCES CITED

The following references are of record in the file of this patent:

UNITED STATES PATENTS

| Number | Name | Date |
|---|---|---|
| 1,234,387 | Pugh et al. | July 24, 1917 |
| 1,948,273 | Lyon | Feb. 20, 1934 |
| 2,020,885 | Gatta | Nov. 12, 1935 |
| 2,190,669 | Lyon | Feb. 20, 1940 |
| 2,386,241 | Lyon | Oct. 9, 1945 |
| 2,386,242 | Lyon | Oct. 9, 1945 |